US010442976B1

(12) United States Patent
You et al.

(10) Patent No.: US 10,442,976 B1
(45) Date of Patent: Oct. 15, 2019

(54) OIL-SOLUBLE COATED PARTICLE FLOW MODIFIER FOR FRACTURED-VUGGY CARBONATE RESERVOIR AND PREPARATION METHOD AND USE THEREOF

(71) Applicants: China University of Geosciences (Beijing), Beijing (CN); China University of Petroleum (East China), Qingdao (CN)

(72) Inventors: Qing You, Beijing (CN); Caili Dai, Qingdao (CN); Long He, Urumqi (CN); Jichao Fang, Qingdao (CN); Baolei Jiao, Urumqi (CN); Liang Li, Urumqi (CN); Guang Zhao, Qingdao (CN); Yifei Liu, Qingdao (CN); Yan Zhang, Beijing (CN); Pan Wang, Beijing (CN)

(73) Assignees: China University of Geosciences (Beijing), Beijing (CN); China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/276,027

(22) Filed: Feb. 14, 2019

(30) Foreign Application Priority Data

Oct. 31, 2018 (CN) .......................... 2018 1 1286261

(51) Int. Cl.
*C09K 8/516* (2006.01)
*E21B 43/16* (2006.01)
*C09K 8/502* (2006.01)

(52) U.S. Cl.
CPC .............. *C09K 8/516* (2013.01); *C09K 8/502* (2013.01); *E21B 43/16* (2013.01); *C09K 2208/08* (2013.01)

(58) Field of Classification Search
None
See application file for complete search history.

(56) References Cited

U.S. PATENT DOCUMENTS

| | | | | |
|---|---|---|---|---|
| 2007/0161515 | A1* | 7/2007 | Bicerano | C09K 8/68 507/117 |
| 2012/0325473 | A1* | 12/2012 | Bicerano | B01J 31/0211 166/280.2 |
| 2013/0292123 | A1* | 11/2013 | Murphree | E21B 34/14 166/308.1 |
| 2016/0215207 | A1* | 7/2016 | Maeda | C09K 8/62 |
| 2016/0326351 | A1* | 11/2016 | Yalcin | C08L 23/0815 |

(Continued)

*Primary Examiner* — Colleen P Dunn
*Assistant Examiner* — Ross J Christie
(74) *Attorney, Agent, or Firm* — Volpe and Koenig, P.C.

(57) ABSTRACT

An oil-soluble coated particle flow modifier, a preparation method thereof, and a use thereof in fractured-vuggy carbonate reservoirs mining. The oil-soluble coated particle flow modifier is of a core-shell structure, which has a core layer of a coated core and a shell layer of a coating agent, wherein the coated core is made of a plugging material, and the coating agent consists of petroleum resin and hollow beads. Based on the total weight of the coated particle flow modifier, the content of the petroleum resin, the hollow beads, the cotton linters, and the coated cores is 10-40 wt %, 9-40 wt %, 1-10 wt %, and 35-80 wt %, respectively. A preparation method of the coated particle flow modifier and a use of the coated particle flow modifier in fractured-vuggy carbonate reservoirs mining to improve oil recovery is also provided.

18 Claims, 3 Drawing Sheets

Petroleum Resin    Hollow Beads    Cotton Linters    Coating Agent

(56) References Cited

U.S. PATENT DOCUMENTS

2017/0253788 A1* 9/2017 Ivanov .................. E21B 43/267
2017/0321112 A1* 11/2017 Lecerf ...................... C09K 8/64
2017/0369708 A1* 12/2017 Kokel ..................... C08L 67/04

* cited by examiner

OIL-SOLUBLE COATED PARTICLE FLOW MODIFIER FOR FRACTURED-VUGGY CARBONATE RESERVOIR AND PREPARATION METHOD AND USE THEREOF

CROSS REFERENCE TO RELATED APPLICATIONS

The application claims priority to Chinese Application No. 201811286261.9, filed on Oct. 31, 2018, entitled "Oil-Soluble Coated Particle Flow Modifier and Preparation Method and Use Thereof", which is specifically and entirely incorporated herein by reference.

FIELD

The present invention relates to the field of petroleum development, particularly to an oil-soluble coated particle flow modifier, a preparation method thereof, and a use thereof in fractured-vuggy carbonate reservoirs mining.

BACKGROUND

Proved carbonate rock fractured-vuggy carbonate reservoirs account for ⅔ of the reserves in the western region of China, and are one of the important fields for increasing reserve and production in China. Unlike sandstone oil reservoirs, fractured-vuggy carbonate reservoirs mainly comprise fractures and solution caves, and it is difficult to apply conventional deep oil reservoir control technology to fractured-vuggy carbonate reservoirs. A concept of flow channel modification for fractured-vuggy carbonate reservoirs was put forward and proved at mine sites in Tahe Oilfield, and it is proven that flow channel modification is an important measure to further solve the problems of planar waves and its limitations.

Up to now, pilot tests of flow channel modification with particle flow modifiers have been carried out for some fractured-vuggy carbonate reservoirs in China. The particle flow modifiers have attained excellent effects and exhibited a great potential in the pilot tests, but have the following drawbacks: (1) The difference in density between the particles and the water injected into the formation is too high: the particle flow modifiers used at present are mainly regenerated rubber particles, which have density much higher than the density of the water injected into the formation, tend to settle and may result in difficulties in injection and plugging near the well, and have a short effective distance; (2) the particles have to be carried by viscous fluid: since the particles tend to settle strongly, high-viscosity fluid is required to carry the particles, but such high-viscosity fluid can't adapt to the high temperature and high mineralization degree and loses its carrying ability essentially after it enters the formation; consequently, the effect of the measure is severely compromised, the overall construction cost is too high, and it is difficult to apply the measure widely at mine sites; (3) the particles have poor oil/water selectivity, and may cause severe damages to the formation and block the oil flow channels erroneously.

SUMMARY

To solve the technical problems of existing flow modifiers in the prior art, including complex composition of flow modifier, poor oil/water selectivity, excessively high difference in density between the particles and the water injected into the formation, and poor adaptability of high temperature and high-mineralization-degree of the formation, etc., the present invention provides an oil-soluble coated particle flow modifier having simplified composition, a preparation method thereof, and a use thereof in fractured-vuggy carbonate reservoirs mining. The oil-soluble coated particle flow modifier provided in the present invention has high dissolvability in crude oil but is indissoluble in water; and it can plug water flow channels selectively but has a much lower plugging characteristic for oil flow channel; it conglutinates under the high temperature reservoir condition and is insusceptible to high mineralization degree; the difference in density between the particles and the water injected into the formation is lower, and the particles don't settle easily. Thus, the oil-soluble coated particle flow modifier can realize deep flow modification in fractured-vuggy carbonate reservoirs.

To attain the objects described above, in a first aspect, the present invention provides an oil-soluble coated particle flow modifier, wherein the coated particle flow modifier is of a core-shell structure having a core layer of a coated core and a shell layer of a coating agent, wherein, the coated core is made of a plugging material, and the coating agent comprises petroleum resin, hollow beads, and cotton linters; based on the total weight of the coated particle flow modifier, the content of the petroleum resin is 10-40 wt %, the content of the hollow beads is 9-40 wt %, the content of the cotton linters is 1-10 wt %, and the content of the coated core is 35-80 wt %.

Preferably, based on the total weight of the coated particle flow modifier, the content of the petroleum resin is 18-40 wt %, the content of the hollow beads is 15-25 wt %, the content of the cotton linters is 2-7 wt %, and the content of the coated core is 35-60 wt %.

Preferably, the shell layer has a thickness of 0.1-3 mm, further preferably a thickness of 0.1-1 mm.

Preferably, the coated particle flow modifier has a density of 0.80-1.20 $g/cm^3$, and a particle diameter of 0.5-10.0 mm; further preferably, an absolute value of a density difference between the coated particle flow modifier and water injected into the formation is no more than 0.01 $g/cm^3$.

Preferably, the petroleum resin is C5 petroleum resin and/or C9 petroleum resin; further preferably, the petroleum resin has a density of 1.05-1.2 $g/cm^3$.

Preferably, the hollow beads are hollow glass beads; preferably, the hollow glass beads has a density of 0.20-0.60 $g/cm^3$, and a particle diameter of 2-120 μm.

Preferably, the cotton linters are first-cut linters; further preferably, the length of the first-cut linters is less than 0.3 mm.

Preferably, the plugging material is selected from at least one of rubber particles, nut shell particles, and quartz sand particles; preferably, the particle diameter of the plugging material particles is 0.1-10 mm.

In a second aspect, the present invention provides a method for preparing the oil-soluble coated particle flow modifier described above, which comprises the following steps:

(1) mixing petroleum resin in a molten state with hollow beads;

(2) adding cotton linters into the mixture obtained in the step (1) to obtain a coating agent;

(3) coating coated cores with the coating agent obtained in the step (2) to obtain the oil-soluble coated particle flow modifier.

Preferably, in the step (2), the apparent density of the coating agent is 0.6-0.9 $g/cm^3$.

Preferably, in the step (2), the mixing is performed at a temperature of 140-190° C.

In a third aspect, the present invention provides a use of the oil-soluble coated particle flow modifier described above and an oil-soluble coated particle flow modifier prepared with the method described above in fractured-vuggy carbonate reservoirs mining.

The oil-soluble coated particle flow modifier provided in the present invention can agglomerate and conglutinate at 90-140° C. but doesn't deform or conglutinate at normal temperature, and is insusceptible to the mineralization degree of the formation; when the oil-soluble coated particle flow modifier encounters crude oil in deep formation, the low-density hollow beads will float up, the high-density coated cores will settle, part of the cotton linters will settle, and a small part of the cotton linters will be mixed with the crude oil, the petroleum resin will fully dissolved in the crude oil and thereby to keep the oil flow channels fluent, but the petroleum resin is insoluble in water and thereby selectively plugs the water flow channels, especially water flow dominant channels. In addition, the present invention employs a plugging material as the core layer and a coating agent that contains petroleum resin, hollow bead particles and cotton linters as the shell layer to form the oil-soluble coated particle flow modifier, so that the difference in density between the particles and the water injected into the formation is lower, the particles don't settle easily, and thereby deep flow modification in the fractured-vuggy carbonate reservoir is realized.

BRIEF DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention.

FIGS. 2A and 2B is a schematic diagram of oil-soluble coated particle flow modifiers with shell layers different in thickness, wherein, FIG. 2A shows the oil-soluble coated particle flow modifier prepared in example 2, and FIG. 2B shows the oil-soluble coated particle flow modifier prepared in example 1;

FIGS. 3A and 3B provide schematic diagrams illustrating the conglutination characteristic of the oil-soluble coated particle flow modifier, wherein, FIG. 3A is a schematic diagram illustrating the agglomeration of oil-soluble coated particle flow modifier particles prepared in example 2, and FIG. 3B is a schematic diagram illustrating the agglomeration of oil-soluble coated particle flow modifier particles prepared in example 1;

DETAILED DESCRIPTION

Figure 1:
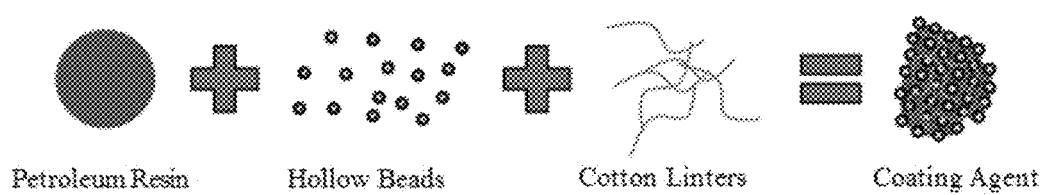
FIG. 1 is a schematic diagram illustrating the principle for preparing the coating agent.

Hereunder some embodiments of the present invention will be detailed. It should be understood that the embodiments described here are only provided to describe and explain the present invention rather than constitute any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In the present invention, those skilled persons in the art should understand that "flow modification" refers to modification of water flow channel; "water injected into formation" refers to water injected through a water injection pipeline into the formation in an oil field, the density of which is usually 1.0-1.2 $g/cm^3$.

The present invention provides an oil-soluble coated particle flow modifier, wherein the coated particle flow modifier is of a core-shell structure having a core layer of coated core and a shell layer of a coating agent, wherein, the coated core is made of a plugging material, and the coating agent comprises petroleum resin, hollow beads, and cotton linters; based on the total weight of the coated particle flow modifier, the content of the petroleum resin is 10-40 wt %, the content of the hollow beads is 9-40 wt %, the content of the cotton linters is 1-10 wt %, and the content of the coated cores is 35-80 wt %.

The oil-soluble coated particle flow modifier provided in the present invention employs a core-shell structure, in which the core layer is a coated cores made of a plugging material and the shell layer is formed by a coating agent that comprises petroleum resin, hollow beads, and cotton linters. Thus, the oil-soluble coated particle flow modifier that has a core-shell structure can conglutinate at high temperatures and form agglomerates of particles and bulky agglomerated particles. When the oil-soluble coated particle flow modifier encounters crude oil in the deep formation, the petroleum resin in the coating agent can be dissolved in the crude oil, so that the agglomerates of particles and bulky agglomerated particles are dispersed, the conglutinated skeleton structures are decomposed, the low-density hollow beads float up, and the high-density coated cores and cotton linters settle, and thereby to keep the oil flow channels fluent; when the oil-soluble coated particle flow modifier encounters formation water in the deep formation, the agglomerates of particles and bulky agglomerated particles formed at a high temperature are insoluble, and thereby selectively plug the water flow channels, especially water flow dominant channels. Thus, deep flow modification in the fractured-vuggy carbonate reservoir is realized.

As long as a plugging material is employed as the core layer and a coating agent that contains petroleum resin, hollow bead particles, and cotton linters is used as the shell layer to form the oil-soluble coated particle flow modifier in the present invention, the difference in density between the oil-soluble coated particle flow modifier and the water injected into the formation can be decreased, the flow modifier particles don't settle easily in the water injected into the formation, the oil-soluble coated particle flow modifier can be injected easily, and the particles don't plug near the well; the flow modifier can be carried conveniently by the water injected into the formation without viscous fluid, and can migrate easily in the deep part of the fractured-vuggy carbonate oil reservoir; the overall construction cost is lower, the process is simple, and the flow modifier is suitable for use widely in flow modification in fractured-vuggy carbonate reservoirs. However, in the present invention, further preferably, the coated particle flow modifier has a density of 0.80-1.20 g/cm$^3$, and a particle diameter of 0.5-10.0 mm; still further preferably, an absolute value of a density difference between the coated particle flow modifier and the water injected into the formation is no more than 0.01 g/cm$^3$. Since the difference in density between the particles of the oil-soluble coated particle flow modifier and the water injected into the formation is lower, the particles don't settle easily, and the oil-soluble coated particle flow modifier can be injected into the formation more easily.

To make the coated particle flow modifier have better dissolvability in crude oil, better conglutination at high temperature, higher selectivity for water flow channel plugging, and less density difference between the flow modifier and the water injected into the formation, preferably, based on the total weight of the oil-soluble coated particle flow modifier, the content of the petroleum resin is 18-40 wt %, the content of the hollow beads is 15-25 wt %, the content of the cotton linters is 2-7 wt %, and the content of the coated cores is 35-60 wt %.

The inventor of the present invention has further found in the research that the density of the obtained oil-soluble coated particle flow modifier can be closer to the density of the water injected into the formation by controlling the thickness of the shell layer of the coated particle flow modifier. Preferably, the shell layer has a thickness of 0.1-3 mm, further preferably a thickness of 0.1-1 mm.

In the coated particle flow modifier according to the present invention, the petroleum resin is a resin material that is soluble in crude oil but insoluble in water, has a high softening point, and does not deform or conglutinate at normal temperature. The petroleum resin may be any petroleum resin in the art. Preferably, the petroleum resin is C5 petroleum resin and/or C9 petroleum resin. C5 petroleum resin and C9 petroleum resin has a softening point of 80-140° C., and does not deform or conglutinate at normal temperature, and can work with other components in the coated particle flow modifier in the present invention to obtain a coated particle flow modifier that has high dissolubility in crude oil and a low plugging characteristic for oil flow channel. The particles of the coated particle flow modifier can agglomerate and conglutinate under the high-temperature reservoir condition, thus to plug the large-size water flow channels. The petroleum resin can cooperate with the coated cores in specific content and the coating agent in specific content, such that the density difference between the obtained oil-soluble coated particle flow modifier and the water injected into the formation is less. Further preferably, the petroleum resin has a density of 1.05-1.2 g/cm$^3$. In the present invention, the agglomeration and conglutination refers to that the particles of the coated particle flow modifier conglutinate to form agglomerates of particles and bulky agglomerated particles when they contact with each other.

In the coated particle flow modifier according to the present invention, the hollow beads are low-density hollow beads at micro-nano scale, which may have compression strength up to 20-100 MPa. When the coated particle flow modifier encounters crude oil in the deep formation, the low-density hollow beads will float up; preferably, the hollow beads are hollow glass beads, and can work with the other components in the coated particle flow modifier in the present invention to form a coated particle flow modifier that has high dissolubility in crude oil, agglomerates and conglutinates at high temperature, and can plug water flow channels selectively, and the density difference between the coated particle flow modifier and the water injected into the formation is less. Further preferably, the hollow glass beads has a density of 0.20-0.60 g/cm$^3$, and a particle diameter of 2-120 μm.

In the coated particle flow modifier according to the present invention, the cotton linters may be any kind of cotton linters in the art. The cotton linters can improve the toughness of the coated particle flow modifier and the granulation of the particles, and thereby can further improve the plugging effect of the flow modifier particles. Preferably, the cotton linters are first-cut linters; further preferably, the cut length of the first-cut linters is less than 0.3 mm. Please see GB/T 20223-2018 for the classification criteria for the cotton linters.

In the coated particle flow modifier according to the present invention, the coated cores may be made of any plugging material in the art; preferably, the coated cores are plugging material particles; preferably, the plugging material particles are selected from at least one of rubber particles (e.g., regenerated rubber particles), nut shell particles, and quartz sand particles; preferably, the particle diameter of the plugging material particles is 0.1-10 mm. The plugging material particles have high stability, can withstand high temperature up to 180° C., and are insusceptible to mineralization degree.

According to a preferred embodiment of the present invention, based on the total weight of the coated particle flow modifier, the content of the petroleum resin is 35-39 wt %, the content of the hollow beads is 17-22 wt %, the content of the cotton linters is 5-7 wt %, the content of the coated cores is 35-41 wt %, and the plugging material is a rubber particle, the petroleum resin is C5 petroleum resin and/or C9 petroleum resin, and the shell layer of the coated particle flow modifier has a thickness of 0.1-0.5 mm.

The coated particle flow modifier provided in the present invention exists stably at normal temperature, and can be stored for a long time without conglutination.

The present invention further provides a method for preparing the coated particle flow modifier described above, which comprises the following steps:

(1) mixing petroleum resin in a molten state with hollow beads;

(2) adding cotton linters into the mixture obtained in the step (1) to obtain a coating agent;

(3) coating coated cores with the coating agent obtained in the step (2) to obtain the oil-soluble coated particle flow modifier.

Wherein, the petroleum resin in a molten state refers a state in which the petroleum resin transforms from a solid state to a liquid state.

In the steps (1) and (2) of the preparation method according to the present invention, the coating agent is prepared as follows (as shown in FIG. 1): melting the petroleum resin to a flow state at a high temperature; first, adding the hollow beads into the petroleum resin in molten state and mixing uniformly; then, the adding cotton linters and mixing uniformly, to obtain the coating agent (as shown in FIG. 1). The coating agent is a high-temperature molten mixture in which the hollow beads and the cotton linters are dispersed in the viscous petroleum resin.

Preferably, in the step (2), the apparent density of the coating agent is 0.6-0.9 g/cm$^3$; thus, the density of the obtained coated particle flow modifier is closer to the density of the water injected into the formation, and the density difference is less. Here, the apparent density is the ratio of mass to apparent volume of the material, wherein, the apparent volume is the sum of the solid volume and the volume of closed voids.

Preferably, in the step (1) of the preparation method according to the present invention, the mixing is performed at a temperature of 140-190° C. Within that temperature range, the petroleum resin in molten state can be mixed uniformly with the hollow beads and the cotton linters.

In the preparation method according to the present invention, the step (3) may be repeated for several times as required to obtain coated particle flow modifiers with different coating thickness.

The preparation method according to the present invention may further comprises: cooling and separating the obtained coated particle flow modifier, wherein, the cooling and separation may be carried out with conventional methods in the art, such as air cooling and cyclone separation.

In the step (3) of the preparation method according to the present invention, the coating method may be any conventional coating method in the art, such as a fluidized bed coating method. Specifically, the fluidized bed coating method is as follows: placing the coated cores at the bottom of a fluidized bed, blowing hot air from bottom to top so that the coated core floats, and spraying a high-temperature coating agent from the top of the fluidized bed.

The present invention further provides a use of the coated particle flow modifier described above and a coated particle flow modifier prepared with the preparation method described above in the fractured-vuggy carbonate reservoirs mining.

Hereunder the present invention will be detailed in examples.

In the following examples, unless otherwise specified, all of the materials are commercially available, and all of the methods are conventional methods in the art.

The C9 petroleum resin is from Shandong Shitar Oil Field Technical Service Inc., and the product code is SDC9;

The C5 petroleum resin is from Shandong Shitar Oil Field Technical Service Inc., and the product code is SDC5;

The hollow glass beads are from Shandong Shitar Oil Field Technical Service Inc., and the product code is SDWZ;

The first-cut linters are from Shandong Shitar Oil Field Technical Service Inc., and the product code is SDDR; the cut length of the first-cut linters is smaller than 0.3 mm;

The regenerated rubber particles are from Shandong Shitar Oil Field Technical Service Inc., and the product code is SDXJ;

The quartz sand particles are from Shandong Shitar Oil Field Technical Service Inc., and the product code is SDKS;

The nut shell particles are from Shandong Shitar Oil Field Technical Service Inc., and the product code is SDGK;

The fluidized bed is from Haian Petroleum Scientific Research Instrument Co., Ltd., and the product code is HASD-SHC.

The product property testing methods involved in the following examples and comparative examples are as follows:

The apparent density of the coating agent is calculated by dividing its mass by its apparent volume; specifically, the mass of the coating agent is measured with a weighing method, the coating agent is cooled to form a solid block, and then the apparent volume of the coating agent is measured with a liquid displacement method, in unit of $g/cm^3$;

The density of the coated particle flow modifier is calculated by dividing its mass by its volume; specifically, the mass of the coated particle flow modifier is measured with a weighing method by weighing the mass of a plurality of particles, the volume of the plurality of particles is measured according to the Boyle's Law on helium, and the average density of the plurality of particles is taken as the density of the coated particle flow modifier, in unit of $g/cm^3$;

The thickness of the shell layer of the coated particle flow modifier is measured with two methods: if the particle diameter is <1 mm, the coated core and the coated particle flow modifier are placed on a microscopic slide respectively and magnified to measure the particle diameter, and the average of the particle diameter differences between the coated particle flow modifier and the coated core is taken as the thickness of the shell layer of the coated particle flow modifier; if the particle diameter is >1 mm, the particle diameter of the coated core and the particle diameter of the coated particle flow modifier are measured with a Vernier caliper respectively, and the average of the particle diameter differences between the coated particle flow modifier and the coated core is taken as the thickness of the shell layer of the coated particle flow modifier, in unit of mm.

The particle diameter of the coated particle flow modifier is measured with two methods: if the particle diameter is <1 mm, the coated particle is placed on a microscopic slide and magnified to measure the particle diameter, and the average particle diameter of a plurality of particles is taken as the particle diameter of the coated particle flow modifier; if the particle diameter is >1 mm, the particle diameter of the coated particles are measured with a Vernier caliper for several times, and the average particle diameter of a plurality of particles is taken as the particle diameter of the coated particle flow modifier, in unit of mm.

Example 1

This example is provided to describe the coated particle flow modifier and the preparation method of the coated particle flow modifier that are provided in the present invention.

Figures 2A, 2B:

(1) 100 g C9 petroleum resin with a density of 1.15 $g/cm^3$ is weighed and melted to a molten state at 180° C. for subsequent use; 50 g hollow glass beads with a density of 0.4 $g/cm^3$ and a particle diameter of 20 μm are weighed and added into the high-temperature molten petroleum resin and mixed uniformly, and finally 15 g first-cut linters are added; the mixture is stirred to a uniform state to obtain a coating agent, which has an apparent density of 0.75 $g/cm^3$;

(2) 100 g regenerated rubber particles with a density of 1.3 $g/cm^3$ and a particle diameter of 2 mm are weighed and placed onto the bottom of a fluidized bed, and blowed with hot air so that the regenerated rubber particles float; the above-mentioned coating agent is sprayed from the top of the fluidized bed to coat the particles, the air flow rate is increased to blow the coated particles out of the fluidized bed when the thickness of the shell layer reaches 0.32 mm, then the coated particles are cooled by air cooling and separated by cyclone separation to obtain a coated particle flow modifier having a core layer of regenerated rubber particles and a shell layer of C9 petroleum resin and hollow glass beads, as shown in FIG. 2B. The coated particle flow modifier has a density of 1.101 $g/cm^3$ and a particle diameter 2.32 mm. The properties of the coated particle flow modifier are measured, and the results are shown in Table 1.

Example 2

This example is provided to describe the coated particle flow modifier and the preparation method of the coated particle flow modifier that are provided in the present invention.

(1) 75 g C9 petroleum resin with a density of 1.15 g/cm$^3$ is weighed and melted to a molten state at 180° C. for subsequent use; 50 g hollow glass beads with a density of 0.4 g/cm$^3$ and a particle diameter of 30 µm are weighed and added into the high-temperature molten petroleum resin and mixed uniformly, and finally 10 g first-cut linters are added; the mixture is stirred to a uniform state to obtain a coating agent, which has an apparent density of 0.69 g/cm$^3$;

(2) 125 g regenerated rubber particles with a density of 1.3 g/cm$^3$ and a particle diameter of 1 mm are weighed and placed onto the bottom of a fluidized bed, and blowed with hot air so that the regenerated rubber particles float; the above-mentioned coating agent is sprayed from the top of the fluidized bed to coat the particles, the air flow rate is increased to blow the coated particles out of the fluidized bed when the thickness of the shell layer reaches 0.1 mm, then the coated particles are cooled by air cooling and separated by cyclone separation to obtain a coated particle flow modifier having a core layer of regenerated rubber particles and a shell layer of C9 petroleum resin and hollow glass beads, as shown in FIG. 2A. The coated particle flow modifier has a density of 1.147 g/cm$^3$ and a particle diameter of 1.10 mm. The properties of the coated particle flow modifier are measured, and the results are shown in Table 1.

Example 3

This example is provided to describe the coated particle flow modifier and the preparation method of the coated particle flow modifier that are provided in the present invention.

(1) 60 g C5 petroleum resin with a density of 1.05 g/cm$^3$ is weighed and melted to a molten state at 140° C. for subsequent use; 75 g hollow glass beads with a density of 0.6 g/cm$^3$ and a particle diameter of 50 µm are weighed and added into the high-temperature molten petroleum resin and mixed uniformly, and finally 8 g first-cut linters are added; the mixture is stirred to a uniform state to obtain a coating agent, which has an apparent density of 0.76 g/cm$^3$;

(2) 165 g nut shell particles with a density of 1.26 g/cm$^3$ and a particle diameter of 2 mm are weighed and loaded onto the bottom of a fluidized bed, and blowed with hot air so that the regenerated rubber particles float; the above-mentioned coating agent is sprayed from the top of the fluidized bed to coat the particles, the air flow rate is increased to blow the coated particles out of the fluidized bed when the thickness of the shell layer reaches 0.5 mm, then the coated particles are cooled by air cooling and separated by cyclone separation to obtain a coated particle flow modifier having a core layer of nut shell particles and a shell layer of C5 petroleum resin and hollow glass beads. The coated particle flow modifier has a density of 1.02 g/cm$^3$ and a particle diameter of 2.50 mm. The properties of the coated particle flow modifier are measured, and the results are shown in Table 1.

Example 4

This example is provided to describe the coated particle flow modifier and the preparation method of the coated particle flow modifier that are provided in the present invention.

(1) 75 g C5 petroleum resin with a density of 1.05 g/cm$^3$ is weighed and melted to a molten state at 140° C. for subsequent use; 45 g hollow glass beads with a density of 0.6 g/cm$^3$ and a particle diameter of 50 µm are weighed and added into the high-temperature molten petroleum resin and mixed uniformly, and finally 10 g first-cut linters are added; the mixture is stirred to a uniform state to obtain a coating agent, which has a density of 0.85 g/cm$^3$;

(2) 180 g quartz sand particles with a density of 2.5 g/cm$^3$ and a particle diameter of 1 mm are weighed and loaded onto the bottom of a fluidized bed, and blowed with hot air so that the regenerated rubber particles float; the above-mentioned coating agent is sprayed from the top of the fluidized bed to coat the particles, the air flow rate is increased to blow the coated particles out of the fluidized bed when the thickness of the shell layer reaches 1 mm, then the coated particles are cooled by air cooling and separated by cyclone separation to obtain a coated particle flow modifier that employs quartz sand particles as a core layer and C5 petroleum resin and hollow glass beads as a shell layer. The density of the coated particle flow modifier is 1.06 g/cm$^3$ and a particle diameter of the coated particle flow modifier is 2.00 mm. The properties of the coated particle flow modifier are measured, and the results are shown in Table 1.

Example 5

This example is provided to describe the coated particle flow modifier and the preparation method of the coated particle flow modifier that are provided in the present invention.

(1) 100 g C9 petroleum resin with a density of 1.15 g/cm$^3$ is weighed and melted to a molten state at 180° C. for subsequent use; 100 g hollow glass beads with a density of 0.5 g/cm$^3$ and a particle diameter of 50 µm are weighed and added into the high-temperature molten petroleum resin and mixed uniformly, and finally 15 g first-cut linters are added into the petroleum resin; the mixture is stirred to a uniform state to obtain a coating agent, which has an apparent density of 0.73 g/cm$^3$;

(2) 150 g regenerated rubber particles with a density of 1.3 g/cm$^3$ and a particle diameter of 2 mm are weighed and loaded onto the bottom of a fluidized bed, and blowed with hot air so that the regenerated rubber particles float; the above-mentioned coating agent is sprayed from the top of the fluidized bed to coat the particles, the air flow rate is increased to blow the coated particles out of the fluidized bed when the thickness of the shell layer reaches 1.60 mm, then the coated particles are cooled by air cooling and separated by cyclone separation to obtain a coated particle flow modifier having a core layer of regenerated rubber particles and a shell layer of C9 petroleum resin and hollow glass beads. The coated particle flow modifier has a density of 0.824 g/cm$^3$ and a particle diameter of 3.60 mm. The properties of the coated particle flow modifier are measured, and the results are shown in Table 1.

Example 6

This example is provided to describe the coated particle flow modifier and the preparation method of the coated particle flow modifier that are provided in the present invention.

(1) 50 g C9 petroleum resin with a density of 1.15 g/cm$^3$ is weighed and melted to a molten state at 180° C. for subsequent use; 30 g hollow glass beads with a density of 0.5 g/cm$^3$ and a particle diameter of 50 µm are weighed and added into the high-temperature molten petroleum resin and mixed uniformly, and finally 7 g first-cut linters are added; the mixture is stirred to a uniform state to obtain a coating agent, which has a density of 0.81 g/cm$^3$;

(2) 240 g quartz sand particles with a density of 2.5 g/cm$^3$ and a particle diameter of 2 mm are weighed and loaded onto the bottom of a fluidized bed, and blowed with hot air so that the regenerated rubber particles float; the above-mentioned coating agent is sprayed from the top of the fluidized bed to coat the particles, the air flow rate is increased to blow the coated particles out of the fluidized bed when the thickness of the shell layer reaches 1.25 mm, then the coated particles are cooled by air cooling and separated by cyclone separation to obtain a coated particle flow modifier having a core layer of regenerated rubber particles and a shell layer of C9 petroleum resin and hollow glass beads. The coated particle flow modifier has a density of 1.201 g/cm$^3$ and a particle diameter of 3.25 mm. The properties of the coated particle flow modifier are measured, and the results are shown in Table 1.

Example 7

A coated particle flow modifier is prepared with the method described in Example 1, but the melting temperature in the step (1) is 200° C. The properties of the coated particle flow modifier are measured, and the results are shown in Table 1.

Comparative Example 1

A coated particle flow modifier is prepared with the method described in the Example 1, but the C9 petroleum resin is replaced with polyethylene. The properties of the coated particle flow modifier are measured, and the results are shown in Table 1.

Comparative Example 2

A coated particle flow modifier is prepared with the method described in the Example 1, but the coated particle flow modifier does not contain hollow glass beads. The properties of the coated particle flow modifier are measured, and the results are shown in Table 1.

Comparative Example 3

The components and the doses of the components of the coated particle flow modifier described in Example 1 are used, and the coating agent is prepared with the method described in the step (1), but the coating method described in the step (2) is omitted; instead, the regenerated rubber particles and the coating agent are directly mixed and stirred, and then the mixture is prepared into particles. The properties of the particle flow modifier are measured, and the results are shown in Table 1.

Comparative Example 4

A coated particle flow modifier is prepared with the method described in the Example 1, but the coated particle flow modifier doesn't contain the first-cut linters. The properties of the coated particle flow modifier are measured, and the results are shown in Table 1.

Test Case 1

This test case is used to test the temperature tolerance property of the coated particle flow modifier.

The temperature tolerance property of the particles is measured by means an aging test as follows: the coated particle flow modifier is mixed with simulated formation water (the simulated formation water is simulated water that is prepared from deionized water according to ions analysis of the water injected into the formation and contains the same ions at the same ion concentrations as the water injected into the simulation), and the mixture is sealed and held under different formation temperature conditions (90° C., 120° C., and 140° C.) for 7 days for aging, then the mixture is taken out, and the particles are observed for changes of shape and size. The particles are deemed as being tolerant to corresponding formation temperature if the particle size is greater than or equal to that of the system before aging; the unit is ° C., and the results are shown in Table 1.

Test Case 2

This test case is used to test the agglomeration and conglutination property of the coated particle flow modifier.

The conglutination property of the coated particle flow modifier is observed with a direct observation method. Specifically, a plurality of flow modifier particles in the examples 1-7 and the comparative examples 1-4 are mixed with simulated formation water, and the mixture is sealed and held at a corresponding formation temperature that the flow modifier particles can withstand (as measured in the test case 1) for 7 days for aging; then the morphology of the particles is observed. The particles are deemed as having a conglutination property if they conglutinate together and the agglomerates of the particles do not split apart when shaking the sealed bottle. The test results are shown in Table 1.

Figures 3A, 3B:

Among the coated particle flow modifiers in the examples 1-7 and the comparative example 4, a plurality of particles of the coated particle flow modifier conglutinate and form agglomerates of particles and bulky agglomerated particles when they contact with each other. Wherein, the test result of the example 2 is shown in FIG. 3A, and the test result of the example 1 is shown in FIG. 3B. The particles in the comparative example 1 can conglutinate; the particles in the comparative example 2 have higher density and settle quickly and agglomerate; the particles in the comparative example 3 are not uniform in size, and the surface coating is not uniform; consequently, the particles in the comparative example 3 have different densities from each other, may settle easily in the simulated formation water, and have a poor conglutination property and can't conglutinate uniformly after long-time aging.

Figure 4A:
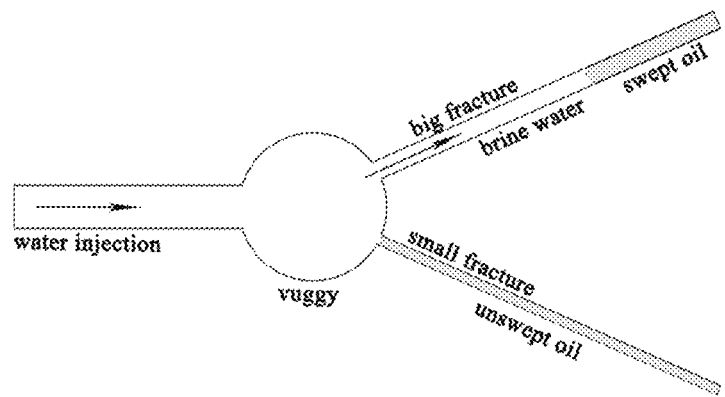
FIGS. 4A and 4B show schematic diagrams of the flow modification mechanism of oil-soluble coated particle flow modifier.
Figure 4B:
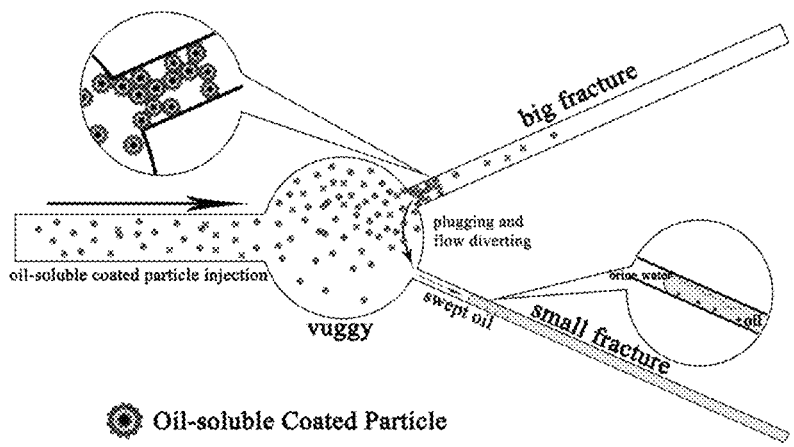

In addition, it is seen from the test results: the coated particle flow modifier that have a core-shell structure in the present invention has a good agglomeration and conglutination property and can form agglomerates of particles and bulky agglomerated particles at a high temperature. Comparing FIG. 4A which shows the state before the channel being modified with FIG. 4B which shows the state after the channel being modified, we can see that the oil-soluble coated particles achieve channel modification of the fracture-cavity carbonate reservoir, thus improving oil recovery.

TABLE 1

| Coated particle flow modifier | Density (g/cm$^3$) | Particle diameter (mm) | Temperature tolerance (° C.) | Conglutination | Thickness of shell layer (mm) |
|---|---|---|---|---|---|
| Example 1 | 1.101 | 2.32 | 140 | Yes | 0.32 |
| Example 2 | 1.147 | 1.10 | 140 | Yes | 0.10 |
| Example 3 | 1.020 | 2.50 | 120 | Yes | 0.50 |
| Example 4 | 1.060 | 2.00 | 120 | Yes | 1.00 |
| Example 5 | 0.824 | 3.60 | 140 | Yes | 1.60 |
| Example 6 | 1.201 | 3.25 | 140 | Yes | 1.25 |
| Example 7 | 1.101 | 2.32 | 140 | Yes | 0.32 |
| Comparative example 1 | 1.086 | 2.32 | 120 | Yes | 0.32 |
| Com- | 1.211 | 2.32 | 140 | Yes | 0.32 |

TABLE 1-continued

| Coated particle flow modifier | Density (g/cm³) | Particle diameter (mm) | Temperature tolerance (° C.) | Con-glutina-tion | Thickness of shell layer (mm) |
|---|---|---|---|---|---|
| parative example 2 | | | | | |
| Comparative example 3 | Can't form a core-shell structure, the particle size is not uniform, the density is not uniform, the conglutination property is poor, and the temperature tolerance property is not uniform. | | | | |
| Comparative example 4 | 1.101 | 2.32 | 140 | Yes | 0.32 |

Test Case 3

This test case is used to test the dissolution process of the coated particle flow modifier in crude oil.

Figure 5:
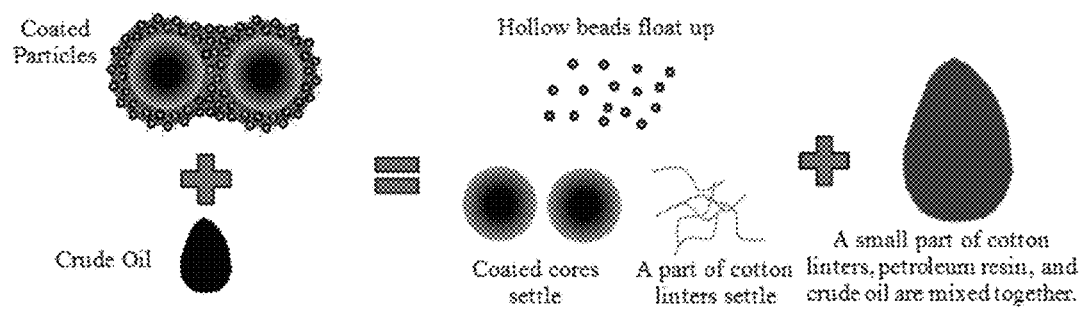
FIG. 5 shows the principle of dissolution of the oil-soluble coated particle flow modifier in crude oil.

The coated particle flow modifiers in the examples 1-7 and the comparative examples 1-4 are mixed with crude oil and stirred respectively after they conglutinate at corresponding formation temperatures that they can withstand. The results are as follows: after the stirring, the agglomerates in the coated particle flow modifiers in the examples 1-7 are dispersed, the hollow beads float up, the coated cores settle, part of the cotton linters settles, a small part of cotton linters are mixed with the crude oil, and the petroleum resin is fully dissolved in the crude oil. The dissolution process of the coated particle flow modifiers in the example 1-7 in crude oil is shown in FIG. 5, exhibiting a specific selective water plugging, without oil plugging. The particles in the comparative example 1 can't be dissolved; in the comparative example 2, the particles can be dissolved, the regenerated rubber particles settle, part of the cotton linters settles, a small part of the cotton linters are mixed with the crude oil, and the petroleum resin is fully dissolved in the crude oil; in the particles (not in a core-shell structure) in the comparative example 3, the petroleum resin is dissolved, the hollow glass beads float up, the regenerated rubber particles settle, a part of the cotton linters settles, and a small part of cotton linters is mixed with the crude oil; in the comparative example 4, the hollow beads float up, the coated core settles, and the petroleum resin is fully dissolved in the crude oil.

It is seen from the test results: in the coated particle flow modifier that is of a core-shell structure in the present invention, the petroleum resin in the coating agent can be dissolved in the crude oil when the coated particle flow modifier encounters with the crude oil at a high temperature, so that the agglomerates of particles are dispersed, the conglutinated skeleton structures are decomposed, the low-density hollow beads float up, and the high-density coated cores settle, thereby to keep oil flow channels fluent, but selectively to plug water flow channels, especially water flow dominant channel. Thus, deep flow modification in the fractured-vuggy carbonate reservoir is realized.

Test Case 4

This test case is used to test the tolerance of the coated particle flow modifier to mineralization degree.

The coated particle flow modifiers in the examples 1-7 and comparative examples 1-4 are placed in saline water with a mineralization degree of $24 \times 10^4$ mg/L (the mineralization degree refers to the sum of contents of inorganic ions, such as Na+, $Ca^{2+}$, $Mg^{2+}$, and Cl−, etc. in the simulated formation water) at corresponding formation temperatures that they can withstand respectively, and held for 7 days for aging; then the coated particle flow modifiers are taken out and observed for any damage. Results: all of the coated particle flow modifiers in the examples 1-7 and the comparative examples 1-4 have no damage. It is seen from the test results: the coated particle flow modifier that have a core-shell structure in the present invention have a high-mineralization-degree tolerance property at high temperatures, and thereby can realize deep flow modification in fractured-vuggy carbonate reservoirs with high-temperature and high-mineralization degree.

Test Case 5

This test case is used to test the influence of the coated particle flow modifier on plugging effect.

The coated particle flow modifiers in the examples 1-7 and the comparative examples 1, 2 and 4 are carried by water injected into the formation into carbonate fractures, and the density of the injected water is controlled so that the absolute density difference between the injected water and the flow modifier particles is <0.01 g/cm³. The mass ratio of the coated particle flow modifier to the water injected into the formation is 20:80, the mixture of the coated particle flow modifier and the water injected into the formation is stirred, and then injected at an injection rate of 0.5 mL/min into a carbonate rock fracture with a width of 2 mm, a height of 25 mm, and a length of 100 mm at 140° C., with a injection volume of 5.0 mL; the carbonate rock fracture with the injected coated particle flow modifier is held in still state for 1 day, and then simulated formation water is injected into the carbonate rock fracture. The pressure in the carbonate rock fracture when 200 min after injecting the coated particle flow modifier is shown in Table 2. It is seen from the test results: the coated particle flow modifier provided in the present invention attains a good plugging effect, can migrate in the fracture easily, and thereby can realize deep flow modification in fractured-vuggy carbonate reservoirs.

TABLE 2

| Coated particle flow modifier | Density (g/cm³) | Plugging pressure (kPa · m⁻¹) |
|---|---|---|
| Example 1 | 1.101 | 170 |
| Example 2 | 1.147 | 157 |
| Example 3 | 1.020 | 155 |
| Example 4 | 1.060 | 146 |
| Example 5 | 0.824 | 130 |
| Example 6 | 1.201 | 136 |
| Example 7 | 1.101 | 158 |
| Comparative example 1 | 1.086 | 81 |
| Comparative example 2 | 1.211 | 42 |
| Comparative example 4 | 1.101 | 110 |

It is seen from the test results in the test cases and Table 1: the particles in the comparative example 3 can't form core-shell structures; after the particles being milled mechanically and separated with a sieve, the size distribution of the particles can be controlled to a certain range, the particles is not uniform in the surface coating and therefore their densities differ from each other. Consequently, the particles may settle easily in simulated formation water, have a poor conglutination property and can't conglutinate uniformly after long-time aging, and don't have a uniform temperature tolerance property. Therefore, the particles could not meet the requirements for oil-soluble coated particle flow modifier. The oil-soluble coated particle flow modifier provided in the present invention has a good temperature tolerance property and can withstand temperature up to 120-140° C., has a high salinity, mineralization degree tolerance property, has a good conglutination property and can form agglomerates of particles and bulky agglomerated particles at high temperatures, can selectively plug water flow channels and keep oil flow channels fluent. The density of the coated particle flow modifier is close to the density of the water injected into the formation, and the density difference is small; therefore, the coated particle flow modifier does not settle easily, can attain a good plugging effect, and does not need a viscous fluid to carry it. Instead, the coated particle flow modifier can be carried by water injected into the formation, and can migrate easily in the deep portion of a fractured-vuggy carbonate oil reservoir; the overall construction cost is lower, the process is simple, and the flow modifier is suitable for use widely in flow modification in fractured-vuggy carbonate reservoirs.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected domain of the present invention.

In addition, it should be noted that the specific technical features described in above specific embodiments may be combined in any appropriate form, provided that there is no conflict among them. To avoid unnecessary repetition, various possible combinations are not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

What is claimed is:

1. An oil-soluble coated particle flow modifier, wherein the coated particle flow modifier is of a core-shell structure having a core layer of coated core and a shell layer of a coating agent, wherein, the coated core is made of a plugging material, and the coating agent comprises petroleum resin, hollow beads, and cotton linters; based on the total weight of the coated particle flow modifier, the content of the petroleum resin is 10-40 wt %, the content of the hollow beads is 9-40 wt %, the content of the cotton linters is 1-10 wt %, and the content of the coated cores is 35-80 wt %.

2. The oil-soluble coated particle flow modifier according to claim 1, wherein based on the total weight of the coated particle flow modifier, the content of the petroleum resin is 18-40 wt %, the content of the hollow beads is 15-25 wt %, the content of the cotton linters is 2-7 wt %, and the content of the coated cores is 35-60 wt %.

3. The oil-soluble coated particle flow modifier according to claim 1, wherein the shell layer has a thickness of 0.1-3 mm.

4. The oil-soluble coated particle flow modifier according to claim 3, wherein the shell layer has a thickness of 0.1-1 mm.

5. The oil-soluble coated particle flow modifier according to claim 1, wherein the coated particle flow modifier has a density of 0.80-1.20 g/cm3, and a particle diameter of 0.5-10.0 mm.

6. The oil-soluble coated particle flow modifier according to claim 1, wherein an absolute value of a density difference between the coated particle flow modifier and water injected into a formation is no more than 0.01 g/cm$^3$.

7. The oil-soluble coated particle flow modifier according to claim 1, wherein the petroleum resin is a C5 petroleum resin and/or a C9 petroleum resin.

8. The oil-soluble coated particle flow modifier according to claim 1, the petroleum resin has a density of 1.05-1.2 g/cm$^3$.

9. The oil-soluble coated particle flow modifier according to claim 1, wherein the hollow beads are hollow glass beads.

10. The oil-soluble coated particle flow modifier according to claim 9, the hollow glass beads has a density of 0.20-0.60 g/cm$^3$, and a particle diameter of 2-120 μm.

11. The oil-soluble coated particle flow modifier according to claim 1, wherein the cotton linters are first-cut linters.

12. The oil-soluble coated particle flow modifier according to claim 11, the first-cut linters have a length less than 0.3 mm.

13. The oil-soluble coated particle flow modifier according to claim 1, wherein the plugging material is selected from at least one of rubber particles, nut shell particles, and quartz sand particles.

14. The oil-soluble coated particle flow modifier according to claim 1, the plugging material particles have a diameter of 0.1-10 mm.

15. A method for preparing the oil-soluble coated particle flow modifier according to claim 1, comprising the following steps:
   (1) mixing petroleum resin in a molten state with hollow beads to form a mixture;
   (2) adding cotton linters into the mixture obtained in the step (1) to obtain a coating agent;
   (3) coating coated cores with the coating agent obtained in the step (2) to obtain the oil-soluble coated particle flow modifier.

16. The method according to claim 15, wherein in the step (2), the coating agent has an apparent density of 0.6-0.9 g/cm$^3$.

17. The method according to claim 15, wherein in the step (1), the mixing is performed at a temperature of 140-190° C.

18. A method of causing deep flow modification in a fractured-vuggy carbonate reservoir comprising injecting the oil-soluble coated particle flow modifier according to claim 1 into a formation of the reservoir.

* * * * *